(12) United States Patent
Sakashita et al.

(10) Patent No.: US 11,015,779 B2
(45) Date of Patent: May 25, 2021

(54) VEHICLE LAMP WITH LIGHT GUIDE HAVING ROD-SHAPED PART AND PLATE-SHAPED PART

(71) Applicant: Koito Manufacturing Co., Ltd., Tokyo (JP)

(72) Inventors: Asami Sakashita, Shizuoka (JP); Hiroaki Hara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 27 days.

(21) Appl. No.: 16/386,677

(22) Filed: Apr. 17, 2019

(65) Prior Publication Data

US 2019/0242546 A1    Aug. 8, 2019

Related U.S. Application Data

(63) Continuation of application No. PCT/JP2017/036231, filed on Oct. 5, 2017.

(30) Foreign Application Priority Data

Oct. 17, 2016    (JP) .............................. JP2016-203823

(51) Int. Cl.
*F21S 43/241*    (2018.01)
*F21S 41/24*    (2018.01)
(Continued)

(52) U.S. Cl.
CPC .......... *F21S 43/241* (2018.01); *B60Q 1/2607* (2013.01); *F21S 41/24* (2018.01);
(Continued)

(58) Field of Classification Search
CPC .... G02B 6/0028; F21S 43/237; F21S 43/239; F21S 41/24; F21S 43/235–251;
(Continued)

(56) References Cited

U.S. PATENT DOCUMENTS

2008/0170414 A1\*   7/2008   Wang ................... G02B 6/0028
                                                    362/612
2013/0003397 A1    1/2013   Buisson
(Continued)

FOREIGN PATENT DOCUMENTS

CN    102782399 A    11/2012
DE    10032927 A1    1/2002
(Continued)

OTHER PUBLICATIONS

Machine translation of JP 2015-041466, retrieved Jul. 8, 2020 from espace.net (Year: 2020).\*

(Continued)

*Primary Examiner* — Rajarshi Chakraborty
*Assistant Examiner* — Steven Y Horikoshi
(74) *Attorney, Agent, or Firm* — Buchanan Ingersoll & Rooney PC

(57) ABSTRACT

A vehicle lamp includes: a first light source; and a light guide including a rod-shaped part and a plate-shaped part. The light guide has a structure in which a circumferential surface of the rod-shaped part is connected to a side surface of the plate-shaped part. The plate-shaped part includes a light diffusion member inside. Light of the first light source is incident on the rod-shaped part from one end of the rod-shaped part, enters the plate-shaped part from the circumferential surface of the rod-shaped part, and is output by the light diffusion member from a principal surface of the plate-shaped part.

3 Claims, 10 Drawing Sheets

(51) Int. Cl.
| | |
|---|---|
| *F21S 43/14* | (2018.01) |
| *F21S 43/237* | (2018.01) |
| *F21S 43/239* | (2018.01) |
| *F21S 43/249* | (2018.01) |
| *B60Q 1/26* | (2006.01) |
| *F21S 43/50* | (2018.01) |
| *F21S 43/245* | (2018.01) |
| *B60Q 1/30* | (2006.01) |
| *B60Q 1/34* | (2006.01) |
| *B60Q 1/44* | (2006.01) |

(52) U.S. Cl.
CPC ............ *F21S 43/14* (2018.01); *F21S 43/237* (2018.01); *F21S 43/239* (2018.01); *F21S 43/245* (2018.01); *F21S 43/249* (2018.01); *F21S 43/50* (2018.01); *B60Q 1/30* (2013.01); *B60Q 1/34* (2013.01); *B60Q 1/44* (2013.01)

(58) Field of Classification Search
CPC . F21S 10/005; B60Q 1/0011; B60Q 3/62–66; F21V 2200/00; F21V 2200/20
See application file for complete search history.

(56) References Cited

U.S. PATENT DOCUMENTS

| | | | |
|---|---|---|---|
| 2014/0160778 A1 | 6/2014 | Nakada | |
| 2014/0321136 A1 | 10/2014 | Reuschel et al. | |
| 2016/0193954 A1 | 7/2016 | Nakada et al. | |
| 2016/0312973 A1* | 10/2016 | Brosinger | B60Q 1/34 |
| 2016/0369967 A1 | 12/2016 | Nakada | |

FOREIGN PATENT DOCUMENTS

| | | |
|---|---|---|
| EP | 2 695 009 A1 | 2/2014 |
| JP | H09-207661 A | 8/1997 |
| JP | 2011-044394 A | 3/2011 |
| JP | 2011-129250 A | 6/2011 |
| JP | 2012-190762 A | 10/2012 |
| JP | 2013-513912 A | 4/2013 |
| JP | 2014-007014 A | 1/2014 |
| JP | 2014-116142 A | 6/2014 |
| JP | 2015-011939 A | 1/2015 |
| JP | 2015-041466 A | 3/2015 |
| WO | 2012/136334 A1 | 10/2012 |

OTHER PUBLICATIONS

Machine Translation of JP 2014-007014 A, retrieved from espacenet on Nov. 17, 2020 (Year: 2020).*
International Search Report (Form PCT/ISA/210) dated Dec. 12, 2017, in corresponding international Application No. PCT/JP2017/036231. (6 pages).
International Preliminary Report on Patentability (Form PCT/IB/373) and the Written Opinion of the International Searching Authority (Form PCT/ISA/237) dated Apr. 23, 2019, in corresponding international Application No. PCT/JP2017/036231. (14 pages).
Extended European Search Report dated Apr. 28, 2020, issued by the European Patent Office in corresponding European Application No. 17862109.0. (6 pages).
Office Action (Notification of Reason for Refusal) dated Mar. 17, 2020, by the Korean Patent Office in corresponding Korean Patent Application No. 10-2019-7013352 and English translation of the Office Action. (7 pages).
Notification of the First Office Action issued by the National Intellectual Property Administration of the People's Republic of China in corresponding Chinese Patent Application No. 201780063700.7 dated Sep. 27, 2020 (16 pages including partial English translation).
Office Action (Decision of Refusal) dated Oct. 23, 2020, by the Korean Patent Office in corresponding Korean Patent Application No. 10-2019-7013352 and English translation of the Office Action. (5 pages).

* cited by examiner

VEHICLE LAMP WITH LIGHT GUIDE HAVING ROD-SHAPED PART AND PLATE-SHAPED PART

CROSS-REFERENCE TO RELATED APPLICATIONS

This application is based upon and claims the benefit of priority from the prior Japanese Patent Application No. 2016-203823, filed on Oct. 17, 2016, and International Patent Application No. PCT/JP2017/036231, filed on Oct. 5, 2017, the entire content of each of which is incorporated herein by reference.

BACKGROUND

Field of the Invention

The present invention relates to vehicle lamps, and more particularly to a vehicle lamp used in a vehicle such as an automobile.

Description of the Related Art

In the related art, vehicle lamps in which light of a light source is output to a space in front of a lamp via a light guide are known. For example, patent document 1 discloses a vehicle lamp having a structure in which light is caused to be incident on a plate-shaped light guide from a side surface and is output to a space in front of the lamp from the principal surface outside the lamp. In this vehicle lamp, the light incident from the side surface of the plate-shaped light guide is reflected by a reflective element such as a step provided on the principal surface of the light guide inside the lamp.

patent document 1: JP2014-116142

In a structure in which light is output from a light guide by using a reflective element such as a step, uniform surface light emission from the light guide has been difficult.

SUMMARY OF THE INVENTION

The embodiments address the above-described issue, and a general purpose thereof is to provide a technology for improving the uniformity of light emission on the light guide surface.

An embodiment of the present invention relates to a vehicle lamp. The vehicle lamp includes: a first light source; and a light guide including a rod-shaped part and a plate-shaped part. The light guide has a structure in which a circumferential surface of the rod-shaped part is connected to a side surface of the plate-shaped part. The plate-shaped part includes a light diffusion member inside. Light of the first light source is incident on the rod-shaped part from one end of the rod-shaped part, enters the plate-shaped part from the circumferential surface of the rod-shaped part, and is output by the light diffusion member from a principal surface of the plate-shaped part. According to the embodiment, the uniformity of light emission on the light guide surface is improved.

It is to be noted that an embodiment obtained by combining the elements described above as appropriate can also be encompassed by the scope of the invention for which patent protection is sought through the present patent application.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

An embodiment of the present invention relates to a vehicle lamp. The vehicle lamp includes: a first light source; and a light guide including a rod-shaped part and a plate-shaped part. The light guide has a structure in which a circumferential surface of the rod-shaped part is connected to a side surface of the plate-shaped part. The plate-shaped part includes a light diffusion member inside. Light of the first light source is incident on the rod-shaped part from one end of the rod-shaped part, enters the plate-shaped part from the circumferential surface of the rod-shaped part, and is output by the light diffusion member from a principal surface of the plate-shaped part. According to the embodiment, the uniformity of light emission on the light guide surface is improved.

The rod-shaped part and the plate-shaped part may be an integrally molded product. Light that leaks from the circumferential surface in the process of traveling in the rod-shaped part from one end to the other end of the rod-shaped part, as the light is reflected by an inner surface, may enter the plate-shaped part. The vehicle lamp may further include a second light source, the light guide may include a side branch that causes light of the second light source to be incident on the rod-shaped part from the circumferential surface of the rod-shaped part, the light of the second light source may be incident on the side branch from an end of the side branch, enter the rod-shaped part from the side branch via the circumferential surface of the rod-shaped part, enter the plate-shaped part from the circumferential surface of the rod-shaped part, and be output by the light diffusion member from the principal surface of the plate-shaped part. In a cross-sectional view orthogonal to a direction of extension of the rod-shaped part, a ratio between a diameter of the rod-shaped part and a thickness of the plate-shaped part may differ between a predetermined first portion and a second portion more distanced from the first light source than the first portion.

A description will be given of suitable embodiments of the present invention with reference to the drawings. The embodiments do not intend to limit the scope of the invention but exemplify the invention. Not all of the features and the combinations thereof described in the embodiments are necessarily essential to the invention. Like numerals are used to represent like elements, members, and processes and a description will be omitted as appropriate. The scales and shapes shown in the figures are defined for convenience's sake to make the explanation easy and shall not be interpreted limitatively unless otherwise specified. Terms like "first", "second", etc. used in the specification and claims do not indicate an order or importance by any means and are used to distinguish a certain feature from the others.

Embodiment 1

Figure 1:
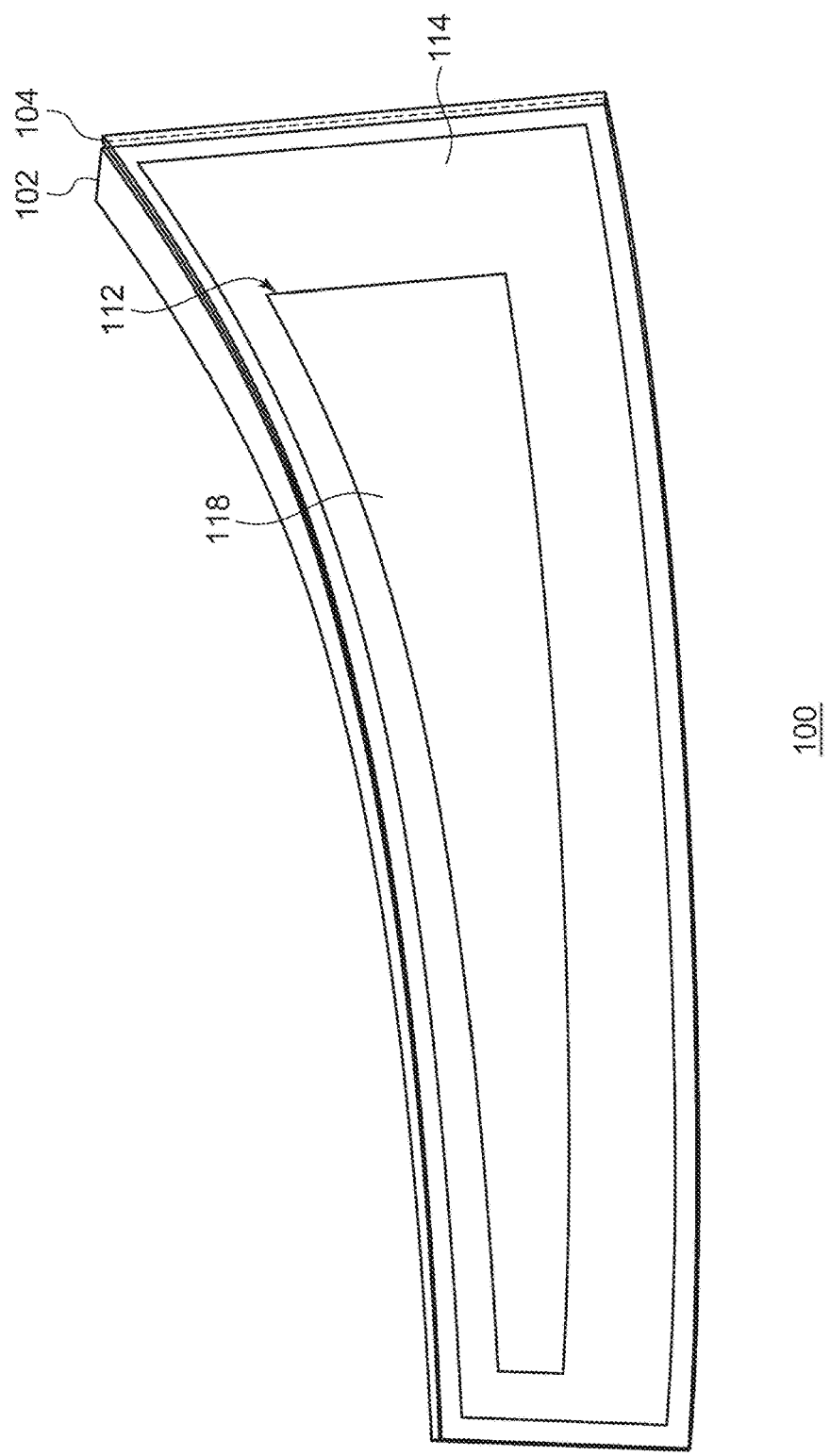
FIG. 1 is a front view of a vehicle lamp according to Embodiment 1.
Figure 2:
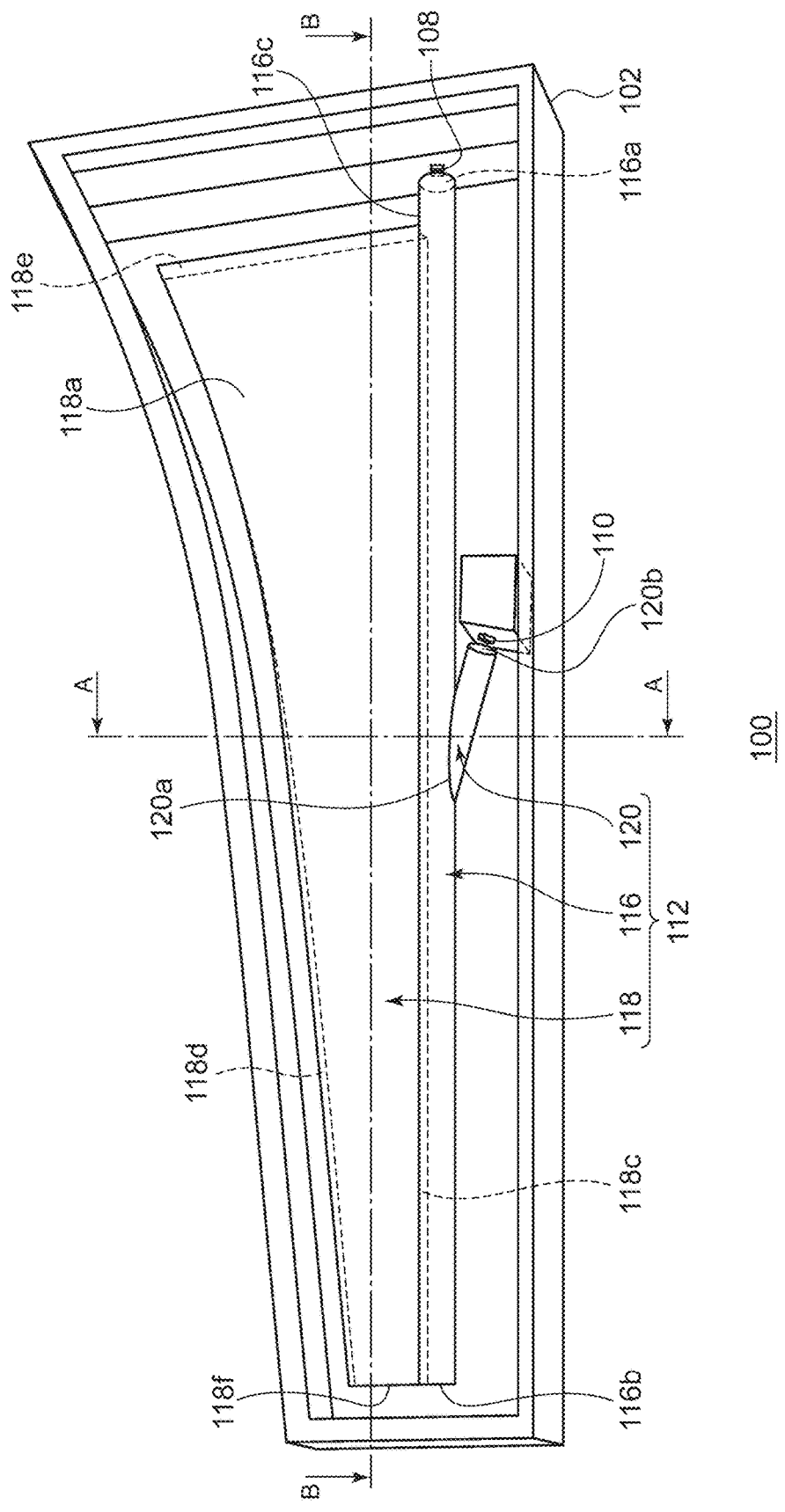
FIG. 2 is a front view showing an internal structure of the vehicle lamp according to Embodiment 1.
Figure 3A:
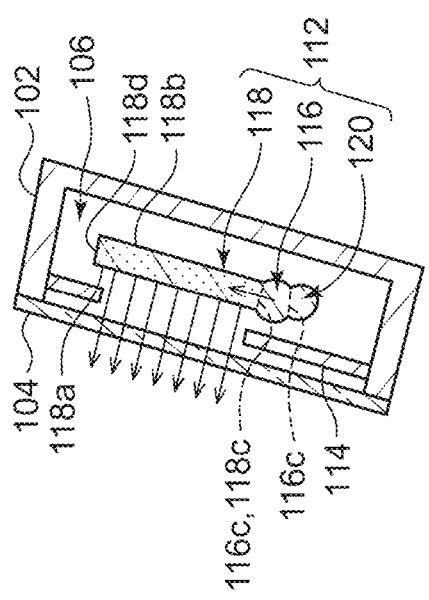
FIG. 3A is a cross-sectional view along line A-A of FIG. 2.
Figure 3B:
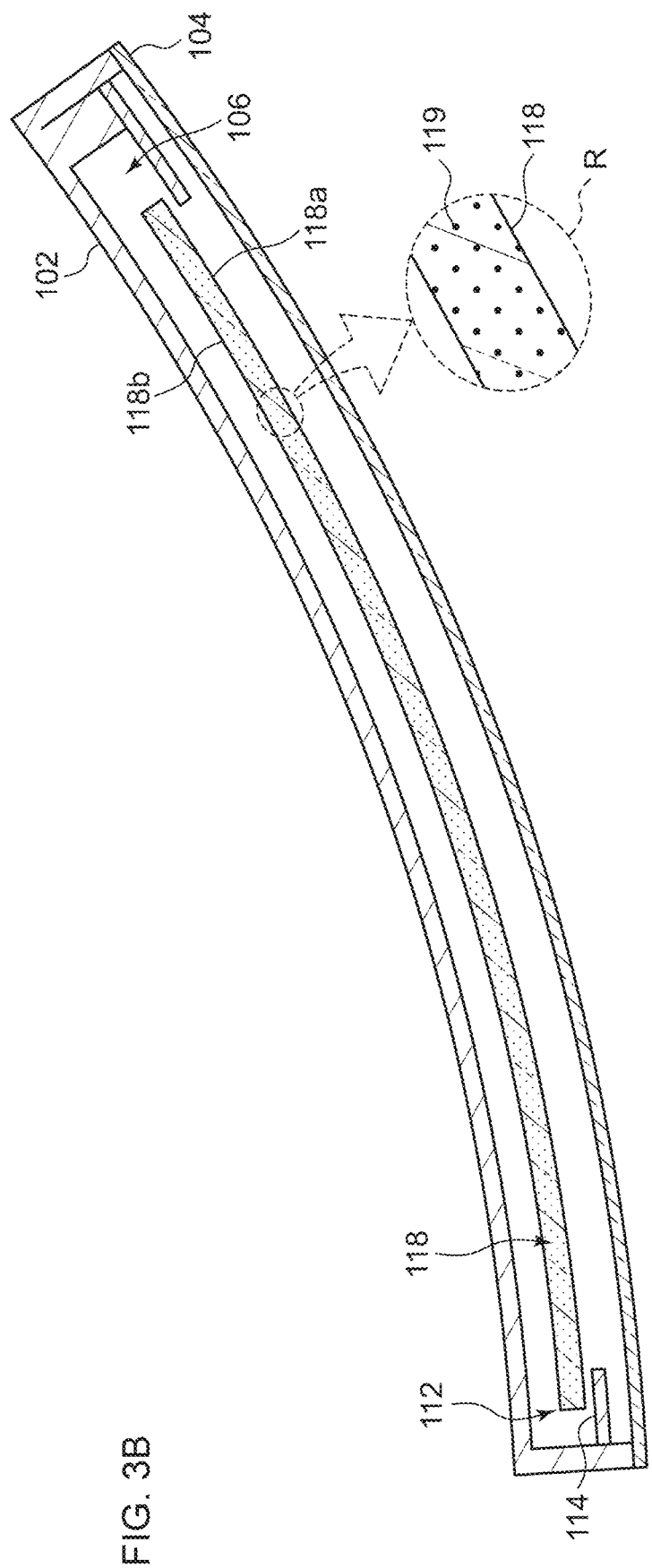
FIG. 3B is a cross-sectional view along line B-B of FIG. 2.
Figure 4:
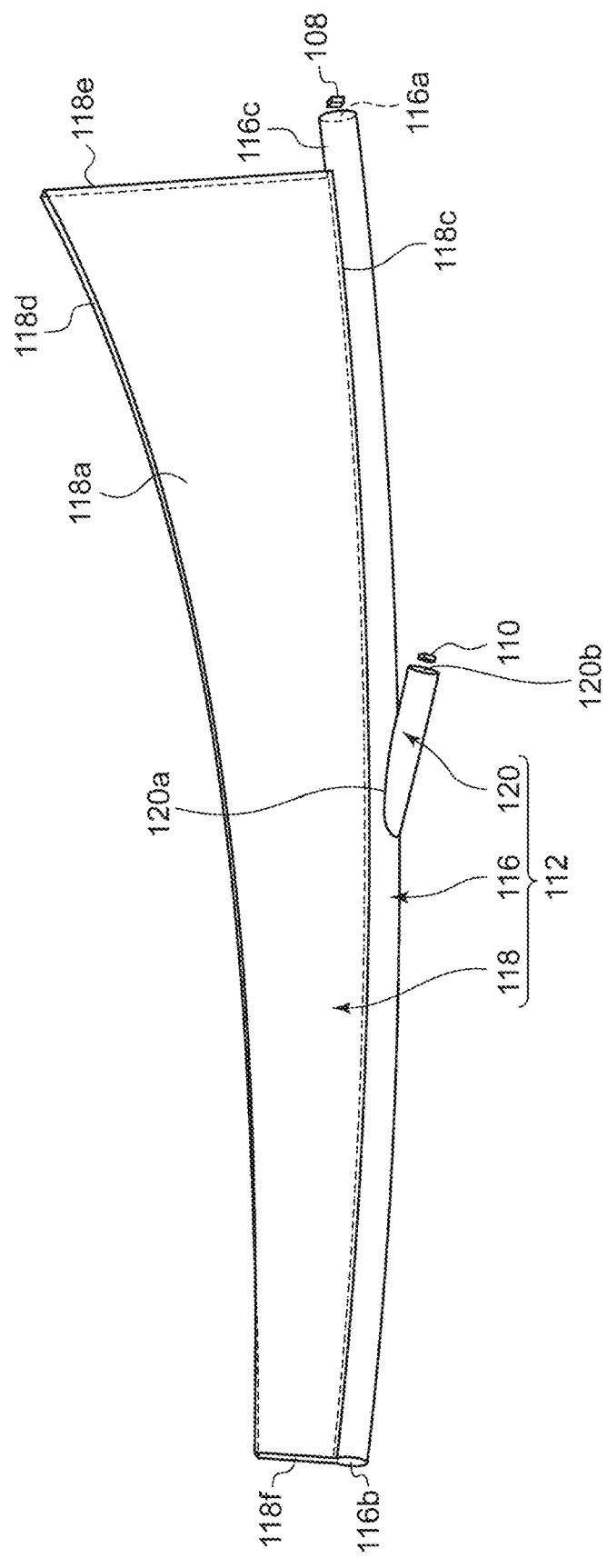
FIG. 4 is a font view of a light source and a light guide provided in the vehicle lamp according Embodiment 1.

FIG. 1 is a front view of a vehicle lamp according to Embodiment 1. FIG. 2 is a front view showing an internal structure of the vehicle lamp according to Embodiment 1. FIG. 3A is a cross-sectional view along line A-A of FIG. 2. FIG. 3B is a cross-sectional view along line B-B of FIG. 2. FIG. 4 is a font view of a light source and a light guide provided in the vehicle lamp according Embodiment 1. FIG. 2 shows a vehicle lamp 100 in which an outer cover 104 and a shielding member 114 are removed.

A vehicle lamp 100 according to the embodiment is, for example, a rear combination lamp provided in a rear portion of the vehicle. The vehicle lamp 100 is provided with a lamp body 102 having an opening and a translucent outer cover 104 that covers the opening of the lamp body 102. A lamp chamber 106 formed by the lamp body 102 and the outer cover 104 houses a first light source 108, a second light source 110, a light guide 112, and a shielding member 114. The first light source 108, the second light source 110, the light guide 112, and the shielding member 114 are fixed to the lamp body 102.

Each of the first light source 108 and the second light source 110 is a light emitting device (LED). The light sources may be a semiconductor light emitting device other than an LED such as a laser diode (LD) and an organic or inorganic electroluminescence (EL) device. The light sources may also be an incandescent lamp, a halogen lamp, a discharge bulb, etc.

The light guide 112 is a resin member having translucency. The material used in the light guide 112 is exemplified by a transparent thermoplastic resin or thermo-setting resin such as polycarbonate resin and acrylic resin. The light guide 112 includes a rod-shaped part 116 and a plate-shaped part 118.

The rod-shaped part 116 is an elongated part that extends in an arbitrary direction. The rod-shaped part 116 according to the embodiment is cylindrical and extends in the vehicle width direction. The rod-shaped part 116 includes an end 116a (or an end face) located in the outward vehicle width direction, the other end 116b (or an end face) located in the inward vehicle width direction, and a circumferential surface 116c connecting the two ends 116a, 116b.

The plate-shaped part 118 includes two principal surfaces 118a, 118b facing away from each other. The principal surface 118 is located on the front side of the lamp, and the principal surface 118b is located on the rear side of the lamp. Further, the plate-shaped part 118 includes a plurality of side surfaces connecting the two principal surfaces 118a, 118b. The plate-shaped part 118 according to the embodiment has a substantially quadrangular shape elongated in the direction of extension of the rod-shaped part 116 and has four side surfaces 118c, 118d, 118e, and 118f.

The side surface 118c and the side surface 118d extend in the direction of extension of the rod-shaped part 116, i.e., in the vehicle width direction. Further, the side surface 118c is located below the side surface 118d in the vertical direction. The side surface 118c extends parallel to the direction of extension of the rod-shaped part 116. The side surface 118d is curved such that it approaches the side surface 118c gradually from the side outward in the vehicle width direction to the side inward. The side surface 118e and the side surface 118f extend in a direction substantially orthogonal to the direction of extension of the rod-shaped part 116. The side surface 118e connects the outward ends of the side surface 118c and the side surface 118d in the vehicle width direction, and the side surface 118f connects the inward ends of the side surface 118c and the side surface 118d in the vehicle width direction.

As shown in an enlarged view of a broken line area R in FIG. 3B, the plate-shaped part 118 includes a light diffusion member 119 inside. The light diffusion member 119 is exemplified by metallic oxide particles (e.g. titanium dioxide particles). For example, the average particle diameter of titanium dioxide particles is 150~500 n, and, preferably, 160~450 nm, and more preferably, 170~450 nm, and, still more preferably, 200~400 nm, and, particularly preferably, 220~400 nm. The content of the light diffusion member 119 is, for example, 1~100 mass ppm with respect to the total mass of the plate-shaped part 118, and, preferably, 0.1~50 mass ppm, and, more preferably, 0.1~10 mass ppm. The percentage of rutile transformation in titanium dioxide particles is 50 mass % or higher, and, preferably, 60 mass % or higher, and, more preferably 70 mass % or higher, and still more preferably, 90 mass % or higher. The plate-shaped part 118 may include another monomer copolymerizable with a primary monomer of the resin used, or a common additive such as an antistatic agent, an antioxidizing agent, a mold release agent, a flame retardant, a lubricant agent, a flow modifier, a bulking agent, a light stabilizer, etc.

The haze value in at least a portion in the direction of thickness is more than 7% and not more than 30% when measured in the plate-shaped part 118 having a thickness of 4 mm. The haze value of the rod-shaped part 116 measured in the same condition is 7% or lower. The transmittance for visible light in at least a portion in the direction of thickness is not less than 60% and not more than 92% when measured in the plate-shaped part 118 having a thickness of 4 mm. The transmittance is defined as a proportion of light output from the principal surface 118a in all directions with respect to the amount of light incident on the plate-shaped part 118 from the principal surface 118b in the direction of normal to the principal surface 118b. The haze value of the plate-shaped part 118 and the rod-shaped part 116 can be measured in compliance with JISK7136, using the haze meter HZ-2 (Suga Test Instruments Co., Ltd). The visible light transmittance of the plate-shaped part 118 can be measured in compliance with JISK7361-1, using the haze meter HZ-2 (Suga Test Instruments Co., Ltd).

Figure 5A:
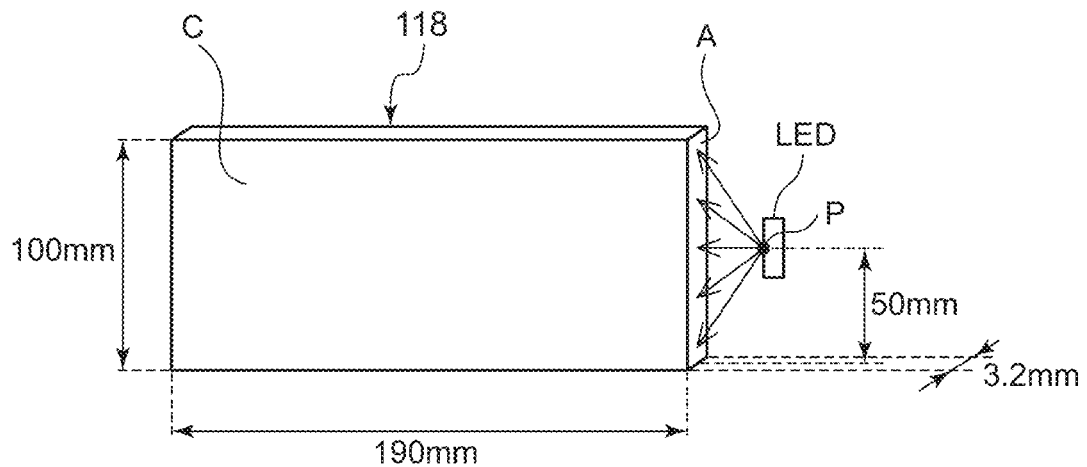
FIGS. 5A and 5B are schematic diagrams showing a method of measuring the light emission efficiency of the plate-shaped part.
Figure 5B:
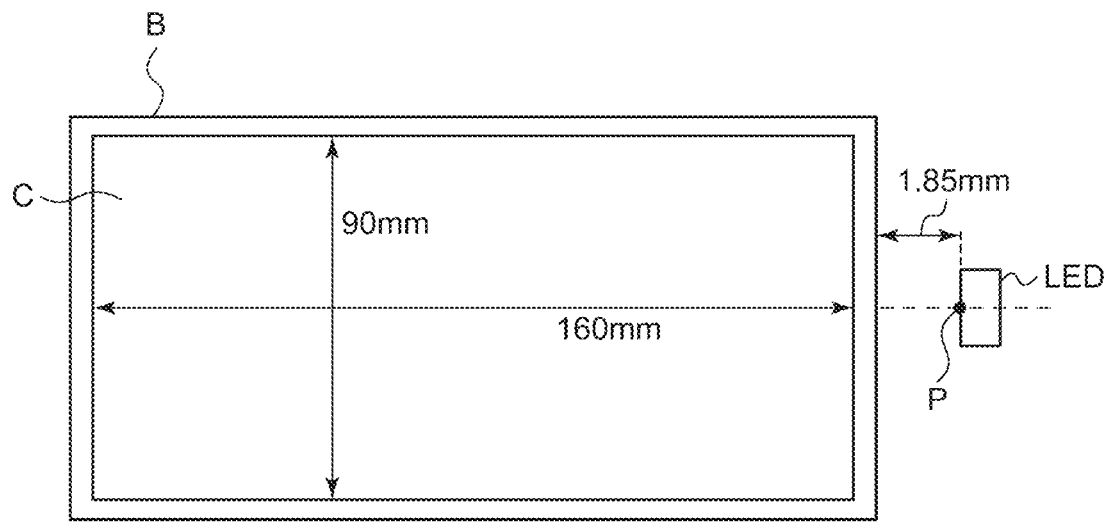

The plate-shaped part 118 meets the following condition for the efficiency of emission of light, incident from the side surfaces 118c~118f, from the principal surface 118a. FIGS. 5A and 5B are schematic diagrams showing a method of measuring the light emission efficiency of the plate-shaped part. FIG. 5A shows the dimension of the plate-shaped part 118 and the arrangement of an LED. FIG. 5B shows the plate-shaped part 118 fitted with a fixing frame B as viewed from the side of the light emission surface C.

As shown in FIG. 5A, a cuboid plate-shaped part 118 having a vertical length of 100 mm, a horizontal length of 190 mm, and a thickness of 3.2 mm is prepared. The side surface A of the plate-shaped part 118 is defined as the incidence surface of the light source light. The LED is provided in the direction of normal to the side surface A. The LED is provided such that the focal point P is oriented toward the side surface A, and the distance from the focal point P to the side surface A is 1.85 mm. The light is spread in a range of 180° from the light emission surface of the LED.

Further, as shown in FIG. 5B, the circumference of the plate-shaped part 118 thus prepared is covered by the fixing plate B. In a condition in which the plate-shaped part 118 is covered by the fixing frame B, the light emission surface C of the plate-shaped part 118 is dimensioned such that the vertical length is 90 mm, and the horizontal length is 160 mm. Neither the front surface nor the rear surface of the fixing frame B reflects light. The light reception surface (not shown) is provided at a distance of $\sqrt{10}$ from the light emission surface C in the direction of normal to the light emission surface C.

In this state, the light is output from the LED. The light flux irradiating a rectangular area of 15° vertically×25° horizontally on the light reception surface defined around the intersection between the normal passing through the center of the light emission surface C and the light reception surface is measured. In the case of the plate-shaped part 118, the light flux irradiating the rectangular area is 0.3% or higher, given that the light flux of light output from the LED is 1.

The plate-shaped part 118 has the following optical characteristics. When the light is incident from the side surfaces 118c~118f, the amount of light output per a unit area from the principal surface 118a is larger than the amount of light output per a unit area from the side surface (e.g. the side surface 118d) facing away from the side surface through which the light is incident (e.g. the side surface 118c). When the light is incident from the principal surface 118b, the amount of light output per a unit area from the principal surface 118a is larger than the amount of light output per a unit area from the side surfaces 118c~118f. In other words, the proportion of light output from the principal surface 118a is larger than the proportion of light output from the side surfaces 118c~118f regardless of whether the light is incident from the side surfaces 118c~118f or the light is incident from the principal surface 118b.

The light guide 112 has a structure in which the circumferential surface 116c of the rod-shaped part 116 is connected to the side surface 118c of the plate-shaped part 118. In other words, the rod-shaped part 116 is located below the plate-shaped part 118 in the vertical direction. The portion of the circumferential surface 116c of the rod-shaped part 116 facing upward in the vertical direction is in contact with the side surface 118c of the plate-shaped part 118. The diameter of the rod-shaped part 116 is larger than the thickness of the plate-shaped part 118 (the length of the side surface 118c in the direction in which the two principal surfaces 118a, 118b are arranged). In this embodiment, the rod-shaped part 116 and the plate-shaped part 118 are an integrally molded product. The integrally molded product can be manufactured by publicly known two-color molding, using a resin material in which the light diffusion member 119 is not mixed and a resin material in which the light diffusion member 119 is mixed. The rod-shaped part 116 is formed by the resin material in which the light diffusion member 119 is not mixed, and the plate-shaped part 118 is formed by the resin material in which the light diffusion member 119 is mixed.

The first light source 108 is arranged such that light output surface thereof faces one end 116a of the rod-shaped part 116. The light output from the first light source 108 is incident on the rod-shaped part 116 from one end 116a of the rod-shaped part 116. The light incident on the rod-shaped part 116 enters the plate-shaped part 118 from the circumferential surface 116c of the rod-shaped part 116. More specifically, the light of the first light source 108 travels in the rod-shaped part 116 as it is reflected by the inner surface from one end 116a of the rod-shaped part 116 to the other end 116b. It should be noted that the rod-shaped part 116 and the plate-shaped part 118 are an integrally molded product, as described above. Therefore, as the light of the first light source 108 travels from one end 116a to the other end 116b, the light leaks from the circumferential surface 116c to the side of the plate-shaped part 118 in an area in which the circumferential surface 116c of the rod-shaped part 116 is in contact with the side surface 118c of the plate-shaped part 118 and enters the plate-shaped part 118.

The light entering the plate-shaped part 118 from the side surface 118c is guided by the light diffusion member 119 distributed inside the plate-shaped part 118 to travel in the direction of the principal surface 118a. The light is then output from the entirety of the principal surface 118a of the plate-shaped part 118. In other words, the entirety of the plate-shaped part 118 of the plate-shaped part 118 outputs light.

Further, the light guide 112 has a side branch 120. The side branch 120 is a part that causes the light of the second light source 110 to be incident on the rod-shaped part 116 via the circumferential surface 116c of the rod-shaped part 116. The side branch 120 is rod-shaped and extends in a direction intersecting the direction of extension of the rod-shaped part 116. One end 120a of the side branch 120 is connected to the circumferential surface 116c of the rod-shaped part 116. For example, the end 120a in contact with an area that faces away from an area of the circumferential surface 116c in contact with the side surface 118c, i.e., the area that faces downward in the vertical direction.

Further, the side branch 120 is connected to the circumferential surface 116c between the two ends 116a, 116b of the rod-shaped part 116. Preferably, the side branch 120 is connected to the circumferential surface 116c between the end 116b opposite to the first light source 108 and the intermediate position of the rod-shaped part 116. In this embodiment, the side branch 120 is connected to the circumferential surface 116c at the intermediate position. A plurality of side branches 120 may be connected to the rod-shaped part 116. In this case, at least one side branch 120 is preferably provided between the end 116b and the intermediate position of the rod-shaped part 116.

The side branch 120 is inclined with respect to the rod-shaped part 116 such that the side branch 120 is distanced from the rod-shaped part 116 away from one end 120a and toward the other end 120b. Further, one end 120a is located inward of the other end 120b in the vehicle width direction. Therefore, the side branch 120 is a part that branches from the rod-shaped part 116 in the outward vehicle width direction and in the vertically downward direction. In this embodiment, the side branch 120 is a molded product integrated with the rod-shaped part 116 and the plate-shaped part 118.

The second light source 110 is provided such that the light output surface thereof faces the other end 120b of the side branch 120. The light of the second light source 110 is incident on the side branch 120 from the end 120b of the side branch 120. The light incident on the side branch 120 travels in the side branch 120 as it is reflected by the inner surface from the other end 120b to one end 120a. The light reaching one end 120a enters the rod-shaped part 116 from the side branch 120 via the circumferential surface 116c of the rod-shaped part 116. The light entering the rod-shaped part 116 travels in the rod-shaped part 116 as it is reflected by the inner surface toward the other end 116b of the rod-shaped part 116. As the light travels toward the other end 116b, the light leaks toward the plate-shaped part 118 from the circumferential surface 116c of the rod-shaped part 116 and enters the plate-shaped part 118.

The light entering the plate-shaped part 118 from the side surface 118c is guided by the light diffusion member 119 distributed inside the plate-shaped part 118 to travel in the direction of the principal surface 118a. The light is then output from the principal surface 118a of the plate-shaped part 118. The light of the second light source 110 advances from the portion of connection between the side branch 120 and the rod-shaped part 116 and travels in inward vehicle width direction inside the rod-shaped part 116. Thus, when the second light source 110 is lighted, the area of the principal surface 118a of the plate-shaped part 118 inward of the portion of connection between the side branch 120 and the rod-shaped part 116 in the vehicle width direction emits light in surface emission.

When the plate-shaped part 118 is elongated, the brightness in an area of the principal surface 118a remote from the first light source 108 may become lower than the brightness in an area close to the first light source 108. This is addressed by causing the light of the second light source 110 to be incident in the middle of the rod-shaped part 116 via the side branch 120 to increase the brightness in an area remote from the first light source 108. In this way, uniform surface light emission on the entirety of the principal surface 118a is realized even when the plate-shaped part 118 is elongated.

The vehicle lamp 100 exhibits the first lamp function by lighting the first light source 108 and exhibits the second lamp function by lighting the second light source 110. Alternatively, the vehicle lamp 100 may exhibit a single lamp function by lighting both the first light source 108 and the second light source 110. The first and second lamp functions may be exemplified by a stop lamp, a tail lamp, a turn-signal lamp, a clearance lamp, and a daytime running lamp.

Figure 6A:
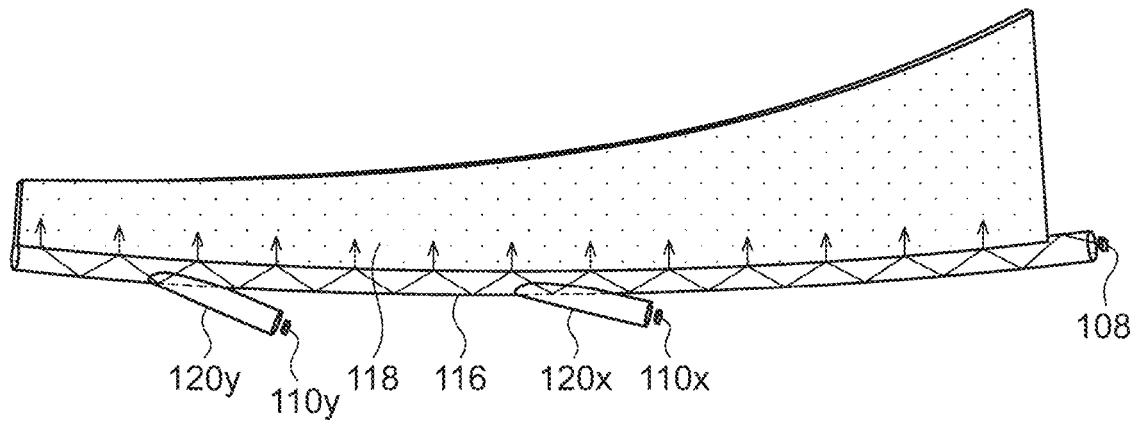
FIGS. 6A, 6B, and 6C illustrate sequential light emission in the vehicle lamp according to Embodiment 1.
Figure 6B:
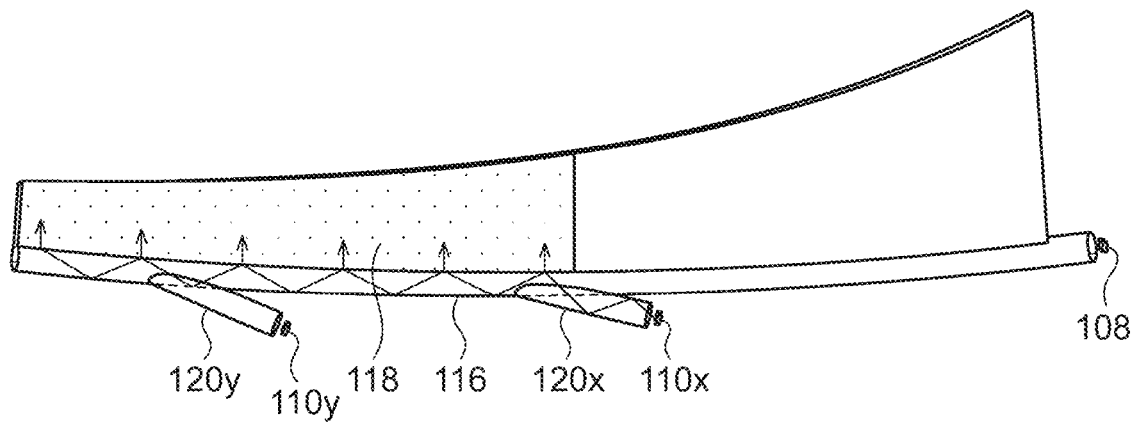
Figure 6C:
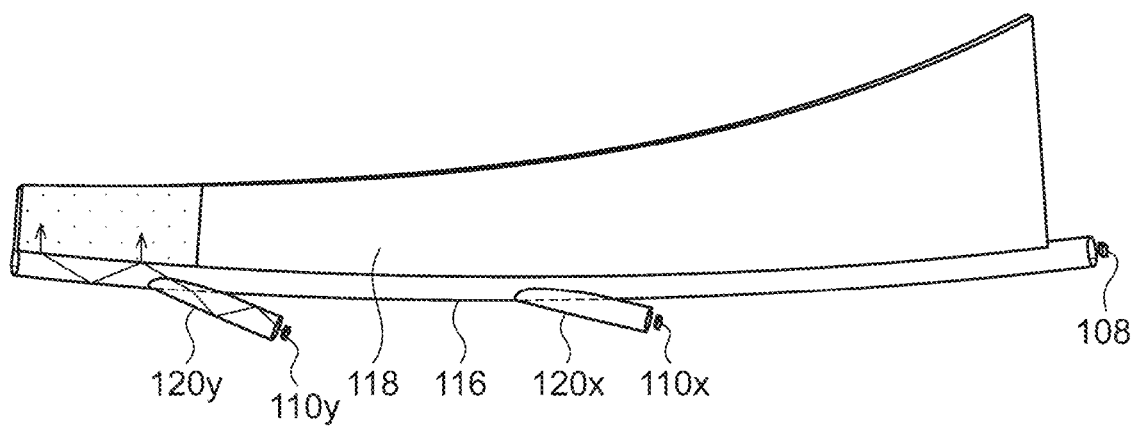

By lighting the first light source 108 and the second light source 110 sequentially, so-called sequential light emission is realized. FIGS. 6A, 6B, and 6C illustrate sequential light emission in the vehicle lamp according to Embodiment 1. The light guide shown in FIGS. 6A~6C is provided with two sets of the side branch 120 and the second light source 110. The side branch 120x and the second light source 110x of the first set are provided at the intermediate position in the vehicle width direction, and the side branch 120y and the second light source 110y of the second set are provided inward of the first set in the vehicle width direction.

As shown in FIG. 6A, the entirety of the plate-shaped part 118 emits light when the first light source 108 is lighted. As shown in FIG. 6B, an area of the plate-shaped part 118 located inward of the side branch 120x in the vehicle width direction emits light, when the second light source 110x is lighted. As shown in FIG. 6C, an area of the plate-shaped part 118 located inward of the side branch 120y in the vehicle width direction emits light, when the second light source 110y is lighted.

For example, the vehicle lamp 100 is placed in the first state in which a portion of the plate-shaped part 118 emits light by lighting the second light source 110y and not lighting the second light source 110x and the first light source 108 (FIG. 6C). Subsequently, the vehicle lamp 100 is placed in the second state in which a wider range of the plate-shaped part 118 than in the first state emits light by lighting the second light source 110x and not lighting the first light source 108 (FIG. 6B). Subsequently, the vehicle lamp 100 is placed in the third state in which the entirety of the plate-shaped part 118 emits light by lighting the first light source 108 (FIG. 6A). By repeating the first state~third state in the stated order, sequential light emission is realized.

It should be noted that, the second light source 110y may or may not be lighted in the second state. Further, the second light sources 110x, 110y may or may not be lighted in the third state. By lighting these light sources, even more uniform surface light emission is realized in the second and third states. By not lighting these light sources, power consumption in the second and third states is reduced. By increasing the number of combinations of the side branch 120 and the second light source 110 and providing them in the vehicle width direction, more smooth sequential light emission is realized.

The vehicle lamp 100 is provided with a shielding member 114. The shielding member 114 is an elongated plate-shaped member extending in the vehicle width direction. The shielding member 114 has a shape of a frame and extends in front of the first light source 108, the second light source 110, the rod-shaped part 116, and the side branch 120 in the lamp. The shielding member 114 also extends in front of the peripheral part of the plate-shaped part 118 in the lamp. The shielding member 114 hides the peripheral parts of the first light source 108, the second light source 110, the rod-shaped part 116, the side branch 120, and the plate-shaped part 118 from a space outside the lamp. The principal surface of the plate-shaped part 118 is exposed through the opening of the frame body forming the shielding member 114. Therefore, as shown in FIG. 1, only the plate-shaped part 118 is visible from outside the lamp.

The plate-shaped part 118 has high translucency. The plate-shaped part 118 is transparent and can output the light incident from the side surface 118c uniformly from the principal surface 118a. In other words, the plate-shaped part 118 appears transparent when the first light source 108 and the second light source 110 are not lighted. Meanwhile, the entirety of the principal surface 118a appears to emit light uniformly when the first light source 108 is lighted. Further, a portion of the principal surface 118a appears to emit light uniformly when the second light source 110 is lighted.

Preferably, a reflective element such as a metal film, a step, or a dome shape may be provided on the end 116b of the rod-shaped part 116. This allows the light reaching the end 116b to return toward the end 116a. As a result, the amount of light output from the plate-shaped part 118 is increased.

As described above, the vehicle lamp 100 according to the embodiment is provided with the first light source 108 and the light guide 112. The light guide 112 includes the rod-shaped part 116 and the plate-shaped part 118 and has a structure in which the circumferential surface 116c of the rod-shaped part 116 is connected to the side surface 118c of the plate-shaped part 118. Further, the plate-shaped part 118 includes the light diffusion member 119 inside. The light of the first light source 108 is incident on the rod-shaped part 116 from one end 116a of the rod-shaped part 116, enters the plate-shaped part 118 from the circumferential surface 116c, and is output by the light diffusion member 119 from the principal surface 118a of the plate-shaped part 118.

This allows surface light emission on the plate-shaped part 118 of the light guide 112 more uniform than in the case of a light guide in which the light incident from the side surface is reflected by a reflective element such as a step provided on the principal surface inside the lamp and is output from the principal surface outside the lamp. Further, since the uniformity of light emission on the light guide surface is improved, a pedestrian, a drive of another vehicle, etc. can view light emission of the vehicle lamp 100 more properly. Accordingly, the visibility of the vehicle lamp 100 is improved. Further, the design and appearance of the vehicle lamp 100 are improved.

Further, the principal surface 118a of the plate-shaped part 118 is caused by the light diffusion member 119 to emit light. For this reason, optical control such as angle adjustment of a reflective surface, which would be required when a reflective element such as a step is used, is not necessary. Accordingly, the light guide 112 is molded in a simpler manner and the manufacturing cost is reduced. Further, the rod-shaped part 116 and the plate-shaped part 118 are an integrally molded product. This increases the efficiency of guiding light from the rod-shaped part 116 to the plate-shaped part 118. Further, the number of components and the manufacturing cost of the vehicle lamp 100 are reduced.

Further, the light of the first light source 108 travels in the rod-shaped part 116 as it is reflected by the inner surface from the end 116a of the rod-shaped part 116 to the end 116b, and, in that process, the light that leaks toward the side surface 118c from the circumferential surface 116c enters the plate-shaped part 118. Therefore, the light of the first light source 108 enters the plate-shaped part 118 gradually in the process of traveling in the rod-shaped part 116. This allows even more uniform surface light emission on the plate-shaped part 118.

Further, the plate-shaped part 118 is capable of outputting the light incident from the side surface 118c efficiently from the principal surface 118a. For this reason, the first light source 108 and the rod-shaped part 116 can be arranged on the same plane as the plate-shaped part 118. This can reduce the thickness of the vehicle lamp 100 as compared to the structure in which the light source is provided on the rear side of the plate-shaped part 118 to cause the plate-shaped part 118 to emit light.

Further, the vehicle lamp 100 is provided with the second light source 110. The light guide 112 is provided with the side branch 120 for causing the light of the second light source 110 to be incident on the rod-shaped part 116 from the circumferential surface 116c. The light of the second light source 110 is incident on the side branch 120 from the end 120b of the side branch 120 and enters the rod-shaped part 116 from the side branch 120 via the circumferential surface 116c of the rod-shaped part 116. Like the light of the first light source 108, the light of the second light source 110 entering the rod-shaped part 116 enters the plate-shaped part 118 from the circumferential surface 116c and is output by the light diffusion member 119 from the principal surface 118a. This can increase the amount of light incident on a specific area of the plate-shaped part 118 (e.g. an area distanced from the first light source 108) so that even more uniform surface light emission on the plate-shaped part 118 is realized. The second light source 110 and the side branch 120 can also be arranged on the same plane as the plate-shaped part 118.

Embodiment 2

The configuration of the vehicle lamp according to Embodiment 2 is similar to that of the vehicle lamp 100 according to Embodiment 1 except that the rod-shaped part 116 is visible from outside the lamp. Those features of the vehicle lamp according to Embodiment 2 that are different from those of Embodiment 1 will mainly be described. Common features will be described briefly, or a description thereof will be omitted.

Figure 7:
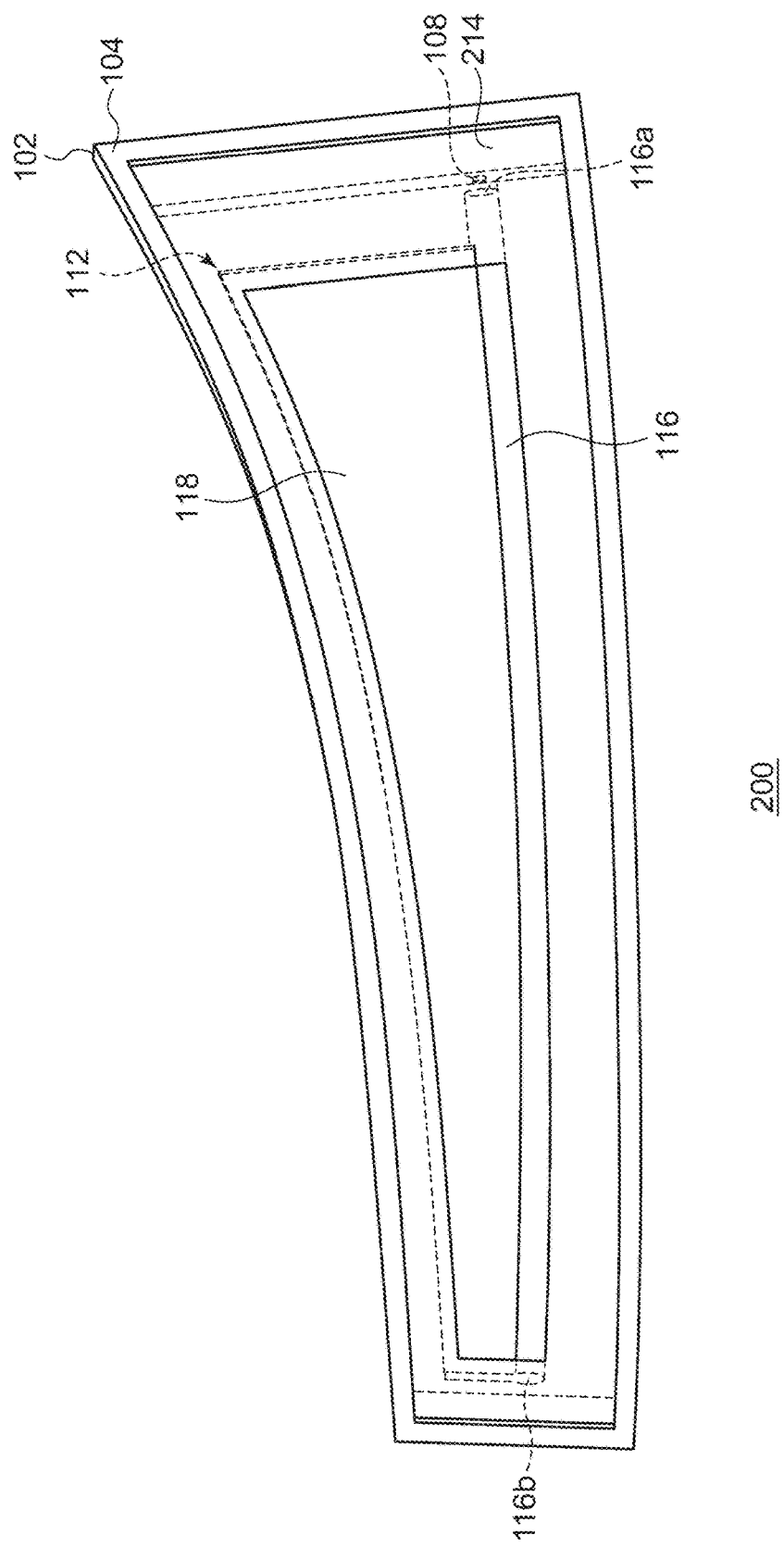
FIG. 7 is a front view of the vehicle lamp according to Embodiment 2.

FIG. 7 is a front view of the vehicle lamp according to Embodiment 2. A shielding member 214 provided in a vehicle lamp 200 according to this embodiment has a shape of a frame and extends in front of the first light source 108, the ends 116a, 116b of the rod-shaped part 116, and the peripheral part of the plate-shaped part 118 in the lamp. The shielding member 214 hides the first light source 108, the ends 116a, 116b of the rod-shaped part 116, and the peripheral part of the plate-shaped part 118 from a space outside the lamp. The area of the rod-shaped part 116 excluding the ends 116a, 116b and the principal surface of the plate-shaped part 118 are exposed through the opening of the frame body forming the shielding member 214. Therefore, the rod-shaped part 116 and the plate-shaped part 118 are visible from outside the lamp. This gives novel appearance to the vehicle lamp 200.

In this embodiment, it is preferred that the side branch 120 and the second light source 110 be not provided. Provision of the side branch 120 and the second light source 110 creates a condition (so-called localized light emission) in which the area of the rod-shaped part 116 connected to the side branch 120 is lighted brighter than the other areas, when the second light source 110 is lighted. In this embodiment, the rod-shaped 116 is also visible from outside so that the localized light emission of the rod-shaped part 116 is also visible. It is therefore preferred that the side branch 120 and the second light source 110 be not provided.

The rod-shaped part 116 may be structured to radiate light to space in front of the lamp from the circumferential surface 116c. In other words, the rod-shaped part 116 may be used as a light emitting part in addition to the plate-shaped part 118. For example, a reflective element such as a step is provided in an area of the circumferential surface 116c facing the rear side of the lamp. The light emitted from the first light source 108 (and the light from the second light source 110, too, in the case that the second light source 110 is provided) travels in the rod-shaped part 116 from the end 116a to the end 116b of the rod-shaped part 116. In that process, a portion of the light leaks from the circumferential surface 116c toward the side surface 118c and enters the plate-shaped part 118. Further, another portion of the light is reflected by the reflective element provided in the circumferential surface 116c and reflected to a space in front of the lamp. The light is output from the circumferential surface 116c to a space in front of the lamp. This improves the visibility of the vehicle lamp 200. It also gives novel appearance to the vehicle lamp 200.

Embodiment 3

The configuration of the vehicle lamp according to Embodiment 3 is similar to that of the vehicle lamp 100 according to Embodiment 1 except for the shape of light guide. Those features of the vehicle lamp according to Embodiment 3 that are different from those of Embodiment 1 will mainly be described. Common features will be described briefly, or a description thereof will be omitted.

Figure 8A:
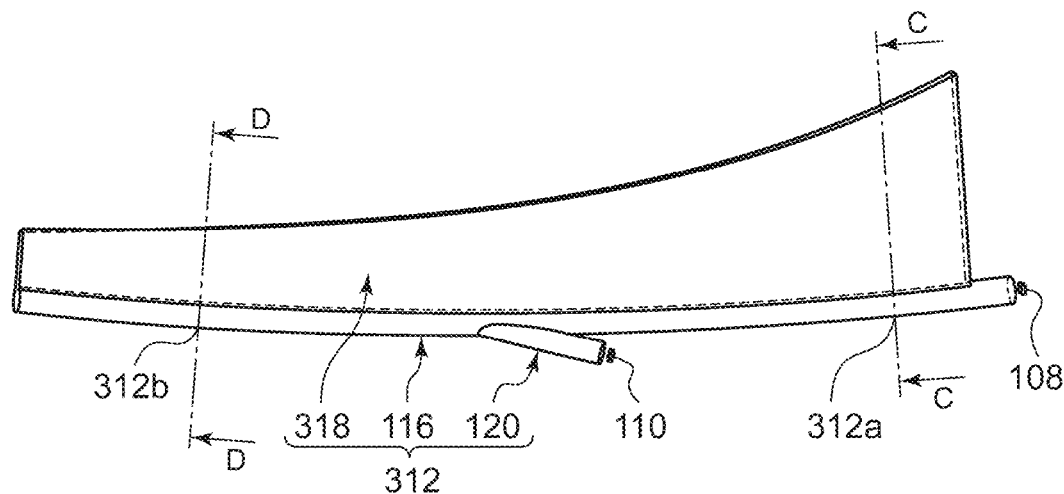
FIG. 8A is a font view of a light source and a light guide provided in the vehicle lamp according Embodiment 3.
Figure 8B:
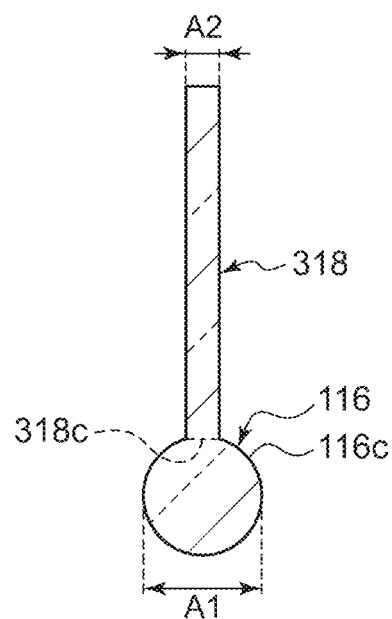
FIG. 8B is a cross-sectional view along line C-C of FIG. 8A.
Figure 8C:
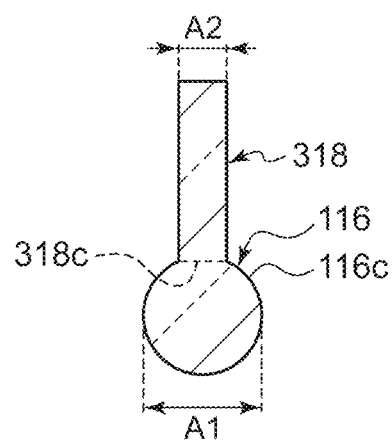
FIG. 8C is a cross-sectional view along line D-D of FIG. 8A.

FIG. 8A is a font view of a light source and a light guide provided in the vehicle lamp according Embodiment 3. FIG. 8B is a cross-sectional view along line C-C of FIG. 8A. FIG. 8C is a cross-sectional view along line D-D of FIG. 8A. The cross section along line C-C and the cross section along line D-D represent cross sections orthogonal to the direction of extension of the rod-shaped part 116. Further, the line C-C is located in a first portion 312a, and line D-D is located in a second portion 312b.

In a cross-sectional view orthogonal to the direction of extension of the rod-shaped part 116, a light guide 312 provided in the vehicle lamp according to this embodiment is configured such that the ratio (A1A2) between the diameter A1 of the rod-shaped part 116 and the thickness A2 of a plate-shaped part 318 differs between the first portion 312a and the second portion 312b more distanced from the first light source 108 than the first portion 312a.

The ratio (A1/A2) is correlated with the relative size of the area in contact with a side surface 318a occupying the circumferential surface 116c of the rod-shaped part 116 as a whole (both the area in contact with the side surface 318c of the plate-shaped part 118 and the area not in contact). When the ratio is large, the area of the circumferential surface 116c in contact with the side surface 318c is small. When the ratio is small, the area of the circumferential surface 116c in contact with the side surface 318c is large. The light in the rod-shaped part travels as it is reflected by the inner surface of the circumferential surface 116c. In this process, the light reaching the area in contact with the side surface 318c enters the plate-shaped part 318 without being reflected by the inner surface.

Therefore, the smaller the ratio (A1/A2), i.e., the larger the area in contact with the side surface 318c, the larger the amount of light in the rod-shaped part 116 entering the plate-shaped part 318. Meanwhile, the smaller the ratio (A1/A2), i.e., the smaller the area in contact with the side surface 318c, the larger the amount of light in the rod-shaped part 116 remaining in the rod-shaped part 116. Therefore, by causing the ratio (A1/A2) to vary between the first portion 312a and the second portion 312b that are at different distances from the first light source 108, the amount of light entering the plate-shaped part 318 from the rod-shaped part 116 is caused to vary. In this way, the amount of light emitted in areas of the plate-shaped part 118 at different distances from the first light source 108 is adjusted.

In this embodiment, the rod-shaped part 116 has the same diameter A1 from the side outward in the vehicle width direction to the side inward. Meanwhile, the plate-shaped part 318 has a shape in which the thickness A2 grows larger gradually from the side outward in the vehicle width direction to the side inward. Therefore, the diameter A1 of the rod-shaped part 116 is identical in the first portion 312a and in the second portion 312b, as shown in FIGS. 8B and 8C.

Meanwhile, the thickness A2 of the plate-shaped part 318 is larger in the second portion 312b than in the first portion 312a. Therefore, the ratio (A1/A2) is smaller in the second portion 312b distanced from the first light source 108 than in the first portion 312a close to the first light source 108. Accordingly, the light in the rod-shaped part 116 can enter the plate-shaped part 318 more easily in the second portion b than in the first portion 312a.

A larger amount of light is present in the first portion 312a of the rod-shaped part 116 close to the first light source 108 than in the second portion 312b distanced from the first light source 208. Therefore, according to the configuration described above, entry of light from the rod-shaped part 116 into the plate-shaped part 318 is inhibited in the first portion 312a, and the amount of light traveling toward the second portion 312b is secured. Meanwhile, much of the light that remains in the rod-shaped part 116 is allowed to enter the plate-shaped part 318 in the second portion 312b. In other words, the amount of light entering from the rod-shaped part 116 into the plate-shaped part 318 is configured to be uniform in the first portion 312a and the second portion 312b. This allows even more uniform surface light emission on the plate-shaped part 118.

In this embodiment, the ratio (A1/A2) is caused to vary by causing the thickness A2 of the plate-shaped part 318 to vary. Alternatively, the ratio (A1/A2) may be caused to vary by causing the diameter A1 of the rod-shaped part 116 or causing both the diameter A1 and the thickness A2 to vary.

Embodiment 4

The configuration of the vehicle lamp according to Embodiment 4 is similar to that of the vehicle lamp 100 according to Embodiment 1 except that two first light sources and two rod-shaped parts are provided. Those features of the vehicle lamp according to Embodiment 4 that are different from those of Embodiment 1 will mainly be described. Common features will be described briefly, or a description thereof will be omitted.

Figure 9A:
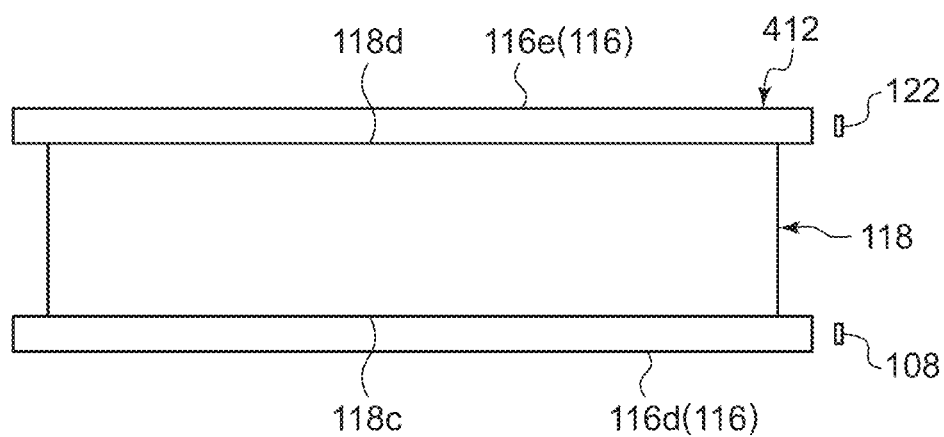
FIG. 9A is a front view schematically showing a light source and a light guide provided in the vehicle lamp according to Embodiment 4.
Figure 9B:
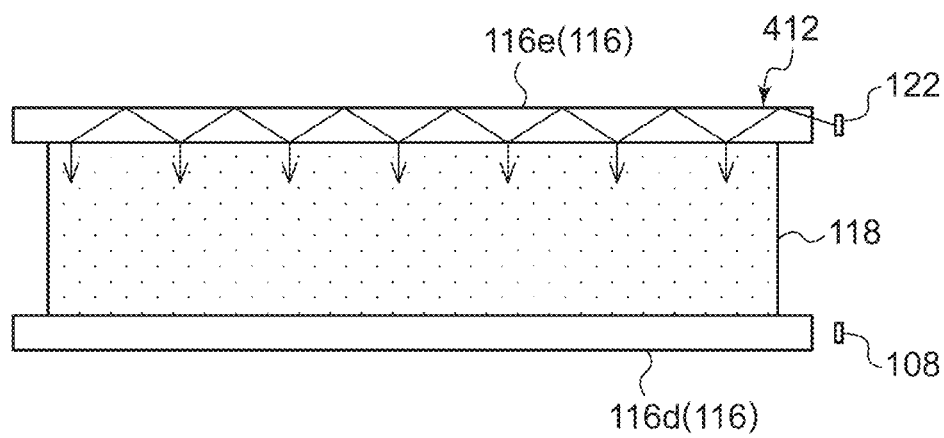
FIG. 9B is a front view schematically showing the light guide in which one of the first light sources is lighted.
Figure 9C:
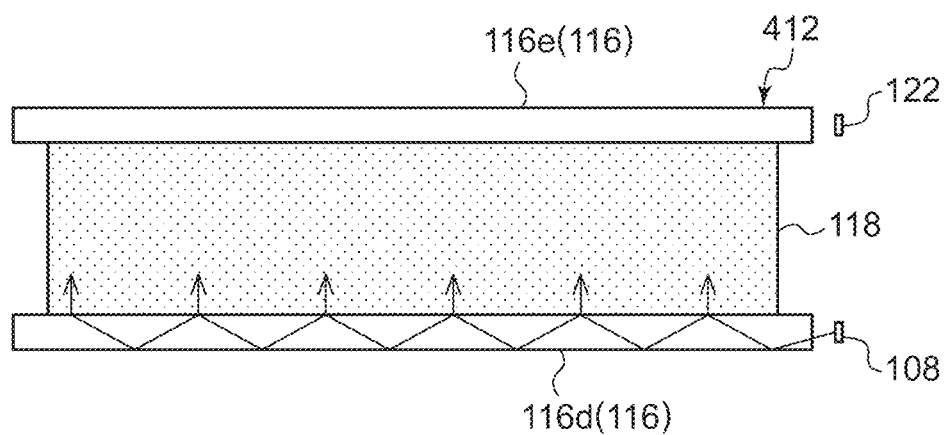
FIG. 9C is a front view schematically showing the light guide in which the other first light source is lighted.

FIG. 9A is a front view schematically showing a light source and a light guide provided in the vehicle lamp according to Embodiment 4. FIG. 9B is a front view schematically showing the light guide in which one of the first light sources is lighted. FIG. 9C is a front view schematically showing the light guide in which the other first light source is lighted. For convenience, one of the first light sources will be referred to as a third light source, and the other first light source will be simply referred to as the first light source.

A light guide 412 provided in the vehicle lamp according to this embodiment is provided with two rod-shaped parts 116. Further, the vehicle lamp is provided with the first light source 108 and a third light source 122. One of the rod-shaped parts 116d is connected to the side surface 118c of the plate-shaped part 118. The other rod-shaped part 116e is connected to the side surface 118d facing away from the side surface 118c. The first light source 108 is provided at the end of the rod-shaped part 116d. The third light source 122 is provided at the end of the rod-shaped part 116e.

As shown in FIG. 9B, the first lamp function is exhibited by lighting the third light source 122 and outputting light from the plate-shaped part 118. Further, as shown in FIG. 9C, the second lamp function is exhibited by lighting the first light source 108 and outputting light from the plate-shaped part 118. According to this embodiment, different lamp functions are exhibited in the same light emitting area. The first and second lamp functions are as described in Embodiment 1. For example, one of the first light source 108 and the third light source 122 is a white light source and the other is an umber light source. The daytime running lamp function is exhibited as one of the first and second lamp functions, and the turn-signal lamp function is exhibited as the other function.

The first lamp function may be exhibited by lighting only one of the first light source 108 and the third light source 122, and the second lamp function may be exhibited by lighting both. For example, the first light source 108 and the third light source 122 may be red light sources. By lighting the first light source 108 or the third light source 122, the tail lamp function is exhibited as the first lamp function. By lighting the first light source 108 and the third light source 122, the stop lamp function is exhibited as the second lamp function. Alternatively, the first light source 108 and the third light source 122 may be white light sources. By lighting the first light source 108 or the third light source 122, the clearance lamp function is exhibited as the first lamp function. By lighting the first light source 108 and the third light source 122, the daytime running lamp function is exhibited as the second lamp function.

The side branch 120 may be connected to the rod-shaped parts 116d, 116e. By causing the light of the second light source 110 to be incident on the side branch 120, the third lamp function is added in addition to the first and second lamp functions. Third lamp function is exemplified by the clearance lamp function, turn-signal lamp function exhibited in a configuration where the tail lamp function and the stop lamp function are exhibited as the first and second lamp functions. The combination of the first~third lamp functions may be defined as appropriate.

Embodiment 5

The configuration of the vehicle lamp according to Embodiment 5 is similar to that of the vehicle lamp according to Embodiment 4 except for the shape of the plate-shaped part. Those features of the vehicle lamp according to Embodiment 5 that are different from those of Embodiments 1 and 4 will mainly be described. Common features will be described briefly, or a description thereof will be omitted.

Figure 10A:
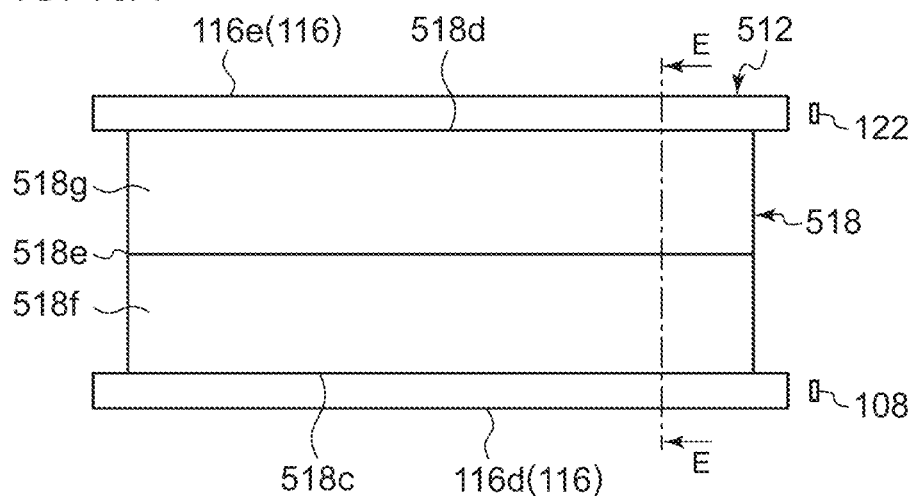
FIG. 10A is a front view schematically showing a light source and a light guide provided in the vehicle lamp according to Embodiment 5.
Figure 10B:
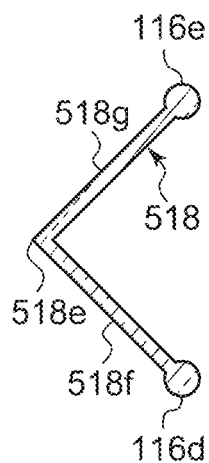
FIG. 10B is a cross-sectional view along line E-E of FIG. 10A.
Figure 10C:
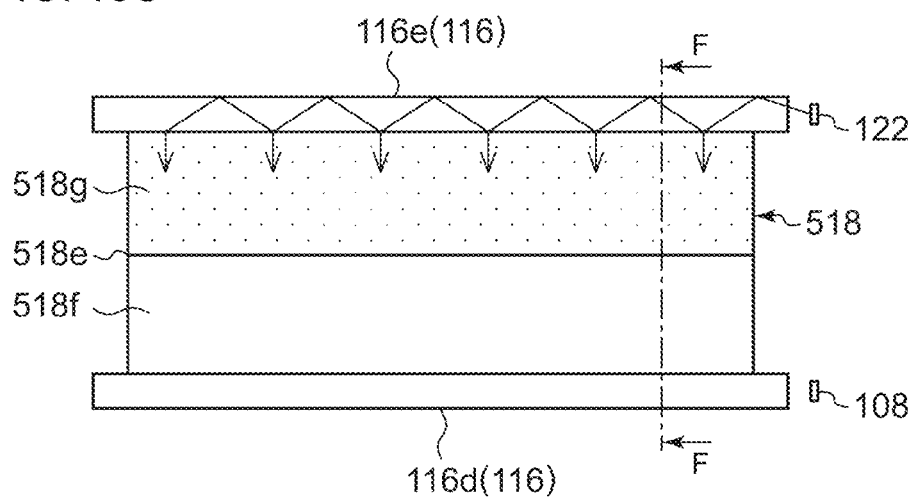
FIG. 10C is a front view schematically showing the light guide in which one of the first light sources is lighted.
Figure 10D:
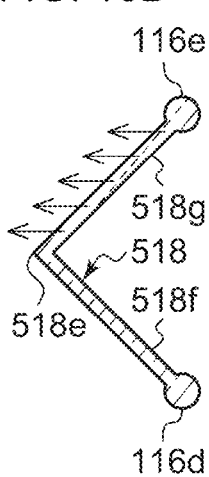
FIG. 10D is a cross-sectional view along line F-F of FIG. 10C.
Figure 10E:
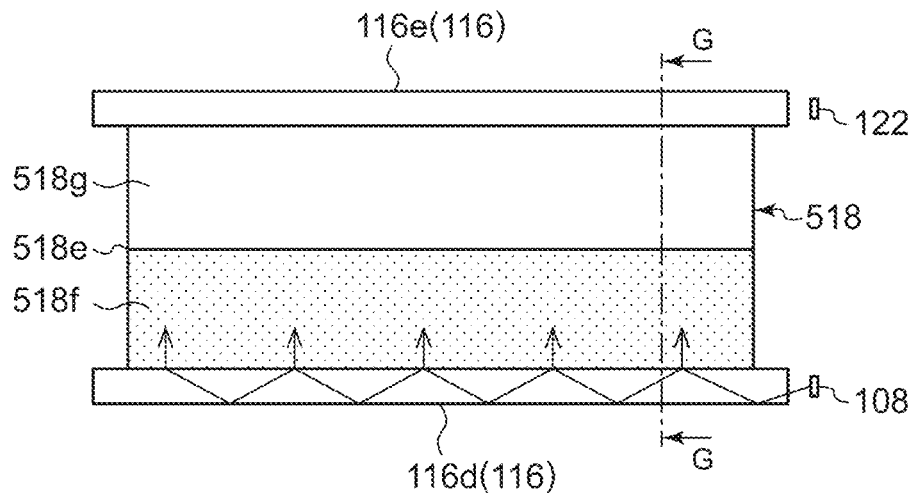
FIG. 10E is a front view schematically showing the light guide in which the other first light source is lighted.
Figure 10F:
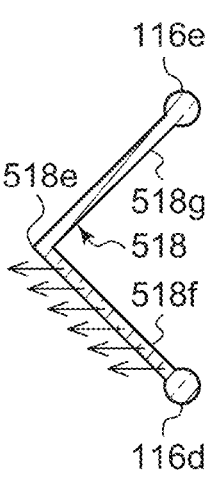
FIG. 10F is a cross-sectional view along line G-G of FIG. 10E.

FIG. 10A is a front view schematically showing a light source and a light guide provided in the vehicle lamp according to Embodiment 5. FIG. 10B is a cross-sectional view along line E-E of FIG. 10A. FIG. 10C is a front view schematically showing the light guide in which one of the first light sources is lighted. FIG. 10D is a cross-sectional view along line F-F of FIG. 10C. FIG. 10E is a front view schematically showing the light guide in which the other first light source is lighted. FIG. 10F is a cross-sectional view along line G-G of FIG. 10E. For convenience, one of the first light sources will be referred to as a third light source, and the other first light source will be simply referred to as the first light source.

A light guide 512 provided in the vehicle lamp according to this embodiment is provided with two rod-shaped parts 116. Further, the vehicle lamp is provided with the first light source 108 and a third light source 122. One of the rod-shaped parts 116d is connected to a side surface 518c of a plate-shaped part 518. The other rod-shaped part 116e is connected to a side surface 518d facing away from the side surface 518c. The first light source 108 is provided at the end of the rod-shaped part 116d. The third light source 122 is provided at the end of the rod-shaped part 116e.

The plate-shaped part 518 has an inflected part 518e between the side surface 518c and the side surface 518d. The inflected part 518e is a portion where a first area 518f extending from the side surface 518c vertically upward and toward the front side of the lamp and a second area 518g extending vertically downward and toward the front side of the lamp are connected. Therefore, the inflected part 518e is a V shape projecting toward the front side of the lamp.

The light emitted from the first light source 108 enters the first area 518f from the rod-shaped part 116d but is prevented by the inflected part 518e from traveling to the second area 518g. The light emitted from the third light source 122 enters the second area 518g from the rod-shaped part 116e but is prevented by the inflected part 518e from traveling to the first area 518f. It is preferred that the inclination angle of the first area 518f with respect to the horizontal surface and the inclination angle of the second area 518g with respect to the horizontal surface be 45° or smaller.

As shown in FIGS. 10C and 10D, the second area 518g emits light when the third light source 122 is lighted. This causes the first lamp function to be exhibited. As shown in FIGS. 10E and 10F, the first area 518f emits light when the first light source 108 is lighted. This causes the second lamp function to be exhibited. According to the embodiment, different areas of the light guide 512 are caused to emit light depending on the lamp function.

The first and second lamp functions are as described in Embodiments 1 and 4. For example, one of the first light source 108 and the third light source 122 is a white light source and the other is an umber light source, and the daytime running lamp function and the turn-signal lamp function are exhibited. In a further example, the tail lamp function is exhibited by lighting the first light source 108 or the third light source 122, and the stop lamp function is exhibited by lighting the first light source 108 and the third light source 122, for example. Alternatively, the clearance lamp function is exhibited by lighting the first light source 108 or the third light source 122, and the daytime running lamp function is exhibited by lighting the first light source 108 and the third light source 122.

The side branch 120 may be connected to the rod-shaped parts 116d, 116e. By causing the light of the second light source 110 to be incident on the side branch 120, the third lamp function is added in addition to the first and second lamp functions. The combination of the first~third lamp functions may be defined as appropriate.

The present invention is not limited to the embodiments described above and the embodiments may be combined, or various modifications such as design changes may be made based on the knowledge of a skilled person. New embodiments resulting from such combinations or modifications are also within the scope of the present invention. The new embodiments will provide the combined advantages of the embodiment and the variation as combined.

The vehicle lamp according to the embodiments may be a headlamp. The plate-shaped part may have a shape other than a quadrangular shape such as a disc shape. The light of the first light source and the second light source may be reflected by a reflector before being incident on the rod-shaped part or the side branch. In Embodiments 1-3, the rod-shaped part may be located vertically above the plate-shaped part.

The rod-shaped part and the plate-shaped part may not be an integrally molded product. In this case, it is preferred to provide a reflective element such as a step in an area on the circumferential surface of the rod-shaped part facing a direction opposite to that of the side surface of the plate-shaped part. The light traveling in the rod-shaped part is reflected by the reflective element toward the side surface of the plate-shaped part and enters the plate-shaped part. The side branch may not be directly connected to the rod-shaped part (referred to as the first rod-shaped part) connected to the plate-shaped part (referred to as the first plate-shaped part). For example, the side branch may be connected to the second rod-shaped part separate from the first rod-shaped part, and the second rod-shaped part and the first rod-shaped part may be connected by the second plate-shaped part separate from the first plate-shaped part. In other words, the side branch, the second rod-shaped part, the second plate-shaped part, the first rod-shaped part, and the first plate-shaped part may be arranged in the stated order.

What is claimed is:

1. A vehicle lamp comprising:
    a first light source; and
    a light guide including a rod-shaped part and a plate-shaped part, wherein
    the light guide has a structure in which a circumferential surface of the rod-shaped part is connected to a side surface of the plate-shaped part,
    the plate-shaped part includes a light diffusion member inside, and
    light of the first light source is incident on the rod-shaped part from one end of the rod-shaped part, enters the plate-shaped part from the circumferential surface of the rod-shaped part, and is output by the light diffusion member from a principal surface of the plate-shaped part,
    wherein in a cross-sectional view orthogonal to a direction of extension of the rod-shaped part, a ratio between a diameter of the rod-shaped part and a thickness of the plate-shaped part differs between a predetermined first portion and a second portion more distanced from the first light source than the first portion, a diameter of the rod-shaped part is identical in the first portion and in the second portion, wherein the vehicle lamp further comprises a second light source, the light guide includes a side branch that causes light of the second light source to be incident on the rod-shaped part from the circumferential surface of the rod-shaped part, the light of the second light source is incident on the side branch from an end of the side branch, enters the rod-shaped part from the side branch via the circumferential surface of the rod-shaped part, enters the plate-shaped part from the circumferential surface of the rod-shaped part, and is output by the light diffusion member from the principal surface of the plate-shaped part.

2. The vehicle lamp according to claim 1, wherein the rod-shaped part and the plate-shaped part are an integrally molded product.

3. The vehicle lamp according to claim 2, wherein light that leaks from the circumferential surface in the process of traveling in the rod-shaped part from one end to the other end of the rod-shaped part, as the light is reflected by an inner surface, enters the plate-shaped part.

* * * * *